(12) United States Patent
McIntyre

(10) Patent No.: US 7,862,406 B2
(45) Date of Patent: Jan. 4, 2011

(54) SAW CHAIN SHARPENING ASSEMBLY

(76) Inventor: Michael McIntyre, P.O. Box 205, Tumbarumba, NSW 2653 (AU)

( * ) Notice: Subject to any disclaimer, the term of this patent is extended or adjusted under 35 U.S.C. 154(b) by 266 days.

(21) Appl. No.: 12/089,462

(22) PCT Filed: Oct. 6, 2006

(86) PCT No.: PCT/AU2006/001467

§ 371 (c)(1),
(2), (4) Date: Apr. 7, 2008

(87) PCT Pub. No.: WO2007/038842

PCT Pub. Date: Apr. 12, 2007

(65) Prior Publication Data

US 2008/0229883 A1    Sep. 25, 2008

(30) Foreign Application Priority Data

Oct. 6, 2005    (AU) ............................. 2005905501

(51) Int. Cl.
*B24B 27/00* (2006.01)

(52) U.S. Cl. .................. 451/349; 76/80.5; 451/293; 451/449

(58) Field of Classification Search .................. 76/80.5; 451/293, 449, 349, 450
See application file for complete search history.

(56) References Cited

U.S. PATENT DOCUMENTS

| | | | |
|---|---|---|---|
| 3,349,645 A * | 10/1967 | Silvey | ............................ 76/40 |
| 3,890,857 A | 6/1975 | Simington | |
| 4,416,169 A * | 11/1983 | Silvey | ......................... 76/80.5 |
| 4,539,871 A | 9/1985 | Simington | |
| 4,559,851 A | 12/1985 | Simington | |
| 4,594,920 A | 6/1986 | Ziegelmeyer | |
| 4,643,050 A | 2/1987 | Silvey | |
| 4,683,780 A * | 8/1987 | Robison | ......................... 76/40 |
| 4,732,056 A | 3/1988 | Foster | |
| 5,031,482 A | 7/1991 | Shepherd | |
| 5,033,333 A | 7/1991 | Shepherd | |
| 5,117,713 A * | 6/1992 | Markusson | ..................... 76/40 |
| 6,589,104 B2 * | 7/2003 | Andrea | ......................... 451/229 |
| 7,175,512 B2 * | 2/2007 | Huntington et al. | ......... 451/234 |

FOREIGN PATENT DOCUMENTS

| | | |
|---|---|---|
| DE | 3422686 A1 | 12/1985 |
| FR | 2347141 | 11/1977 |
| SE | 527002 C2 | 12/2005 |
| WO | 8809237 A1 | 12/1988 |
| WO | 9938638 A1 | 8/1999 |

* cited by examiner

*Primary Examiner*—Timothy V Eley
(74) *Attorney, Agent, or Firm*—Brooks Kushman P.C.

(57) ABSTRACT

A saw chain sharpening assembly including a support member, a grinding head, a clamping device and a cooling system whereby the saw chain sharpening assembly is adapted to provide a means for efficiently sharpening small and/or large chains.

20 Claims, 5 Drawing Sheets

SAW CHAIN SHARPENING ASSEMBLY

TECHNICAL FIELD OF THE INVENTION

The invention relates to the area of saw accessories and in particular to a saw chain sharpening assembly which is adapted to provide a means for efficiently sharpening small and/or large chains.

Whilst the invention can also be applied to any saw chain, for convenience sake it shall be described herein in terms of a sharpening assembly for a chainsaw chain.

BACKGROUND TO THE INVENTION

Conventionally, sharpening machines have been used to sharpen various saw chains once they have become damaged or worn. Most saw chain sharpening machines are capable of effectively sharpening smaller saw chains with a 0.404" pitch however, they are not robust enough to sharpen a larger saw chain having a ¾" pitch.

A further disadvantage with current sharpening machines is that the clamping device is not capable of holding the chains securely enough when larger cuts are required to sharpen a tooth and/or remove worn or damaged material. Generally, most of the current devices require the grinding wheel of a sharpening machine to be passed over the tooth a few times in order to sharpen the tooth. In addition, if the sharpening is not done quickly enough the teeth can overheat resulting in extended sharpening time as it will be necessary to wait for the teeth to cool down. In addition, overheating of the tooth can change the tensile strength of the tooth.

It is an object of the present invention to overcome or substantially ameliorate the disadvantages of the prior art by providing a saw chain sharpening assembly which is adapted to provide a means for efficiently sharpening small and/or large chains.

SUMMARY OF THE INVENTION

The present invention provides a saw chain sharpening assembly including, a support member, a grinding head, a clamping device and a cooling system whereby the saw chain sharpening assembly is adapted to provide a means for efficiently sharpening small and/or large chains.

The support member is preferably in the form of an L-shaped member having a vertical portion and a base frame having at least one leveling means. Provided on top of the support member is preferably a horizontal plate which is adapted to have a grinder head support and a clamping device attached thereto. The horizontal plate is preferably positioned at the top of a vertical stand of the support member and has provided at least one aperture.

The grinder head is preferably connected to the assembly via a grinder head support which is adapted to support and allow adjustment of the grinder head. The grinder head assembly preferably has at least one support bracket member which is adapted to secure the grinder head support and a horizontal plate of the support member to a vertical stand of the support member. The grinder head support preferably has provided at least one aperture which is adapted to receive a securing means, such as a bolt or the like, therethrough which is adapted to provide a means for enabling the angle of the grinder head to be adjusted. The grinder head support preferably has provided a pivot member whereby the grinder head is able to rotate about a central pivotal axis of the pivot member.

The saw chain sharpening assembly preferably further comprises at least one movement controlling means which is adapted to prevent the grinder head from crashing down onto the clamping device. A first movement controlling means is preferably in the form of a return spring which is adapted to be attached to a rear end of the grinder head and prevent it from rising too far. A second movement controlling means is preferably a depth stopper plate which is adapted to be attached to the grinder head support provided directly beneath the grinder head and stop the grinder head upon contact with the depth stopper plate.

The grinder head preferably has a grinding wheel capable of cutting/sharpening a saw chain and a guard member which is adapted to be located over the top portion of the grinding wheel to protect a user of the assembly. The grinder head preferably has provided a support member, which is adapted to provide a means of supporting and/or enabling the components of the grinder head to be attached thereto, and an adjustment member which is adapted to enable the depth of the cut achieved by the grinding wheel to be adjusted. The grinder head further preferably has a motor having sufficient power to drive the grinding wheel of the assembly.

A drive mechanism is preferably provided for driving the grinding wheel of the assembly and includes, but is not limited to, at least one drive pulley and a belt which is adapted to drive the grinding wheel of the assembly. The drive mechanism is preferably adapted to have a guard member positioned thereover to protect the components of the drive assembly.

The clamping device is preferably attached to a horizontal plate of the support member via a clamping nut which can be loosened and/or tightened to adjust at least one component of the clamping device. The clamping device preferably has a slide plate member having a recessed portion, which is adapted to receive a saw chain therein, and at least one clamp plate positioned on either side whereby a first clamp plate is preferably a fixed chain clamp plate and a second clamp plate is preferably an active clamp plate which is adapted to be moveable in order to increase or decrease the pressure applied to a saw chain. The clamping device preferably has an adjustable pivot assembly which is adapted to control the amount of material cut from a saw chain tooth.

In order that the invention may be more readily understood we will describe by way of non-limiting example of a specific embodiment thereof.

BRIEF DESCRIPTION OF THE DRAWING FIGURES

DESCRIPTION OF A PREFERRED EMBODIMENT OF THE INVENTION

Figure 1:
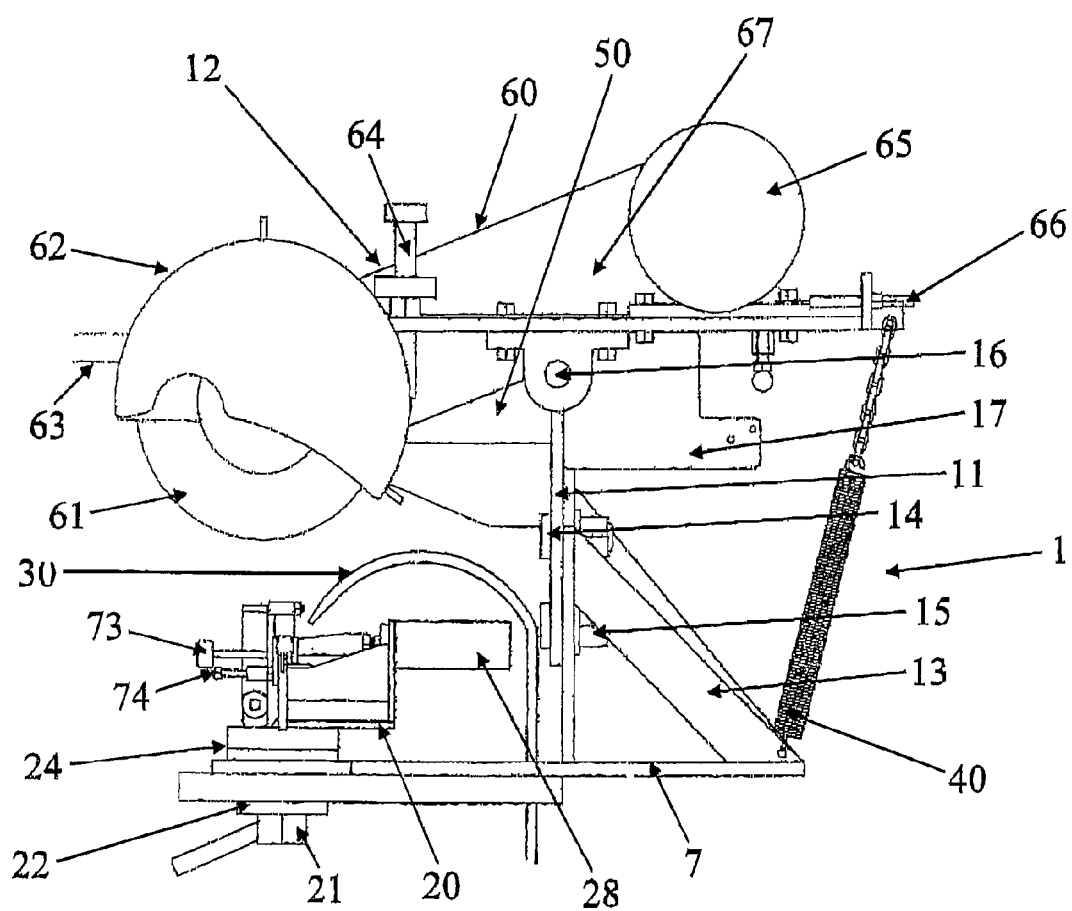
FIG. 1 shows a side view of the grinder and clamping device of the saw chain sharpening assembly according to a preferred embodiment of the invention.
Figure 2:
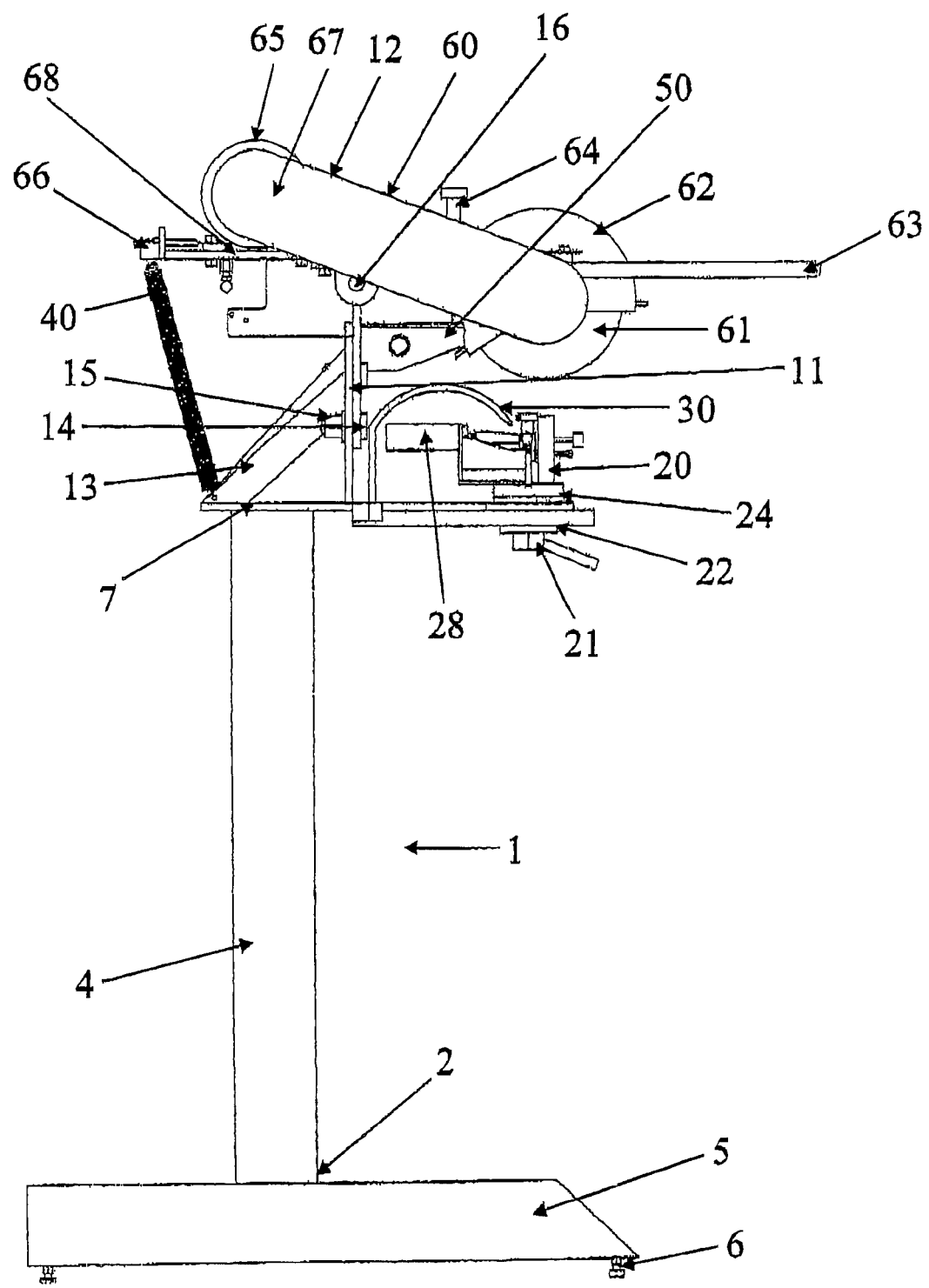
FIG. 2 shows a side view of the saw chain sharpening assembly according to a preferred embodiment of the invention.
Figure 3:
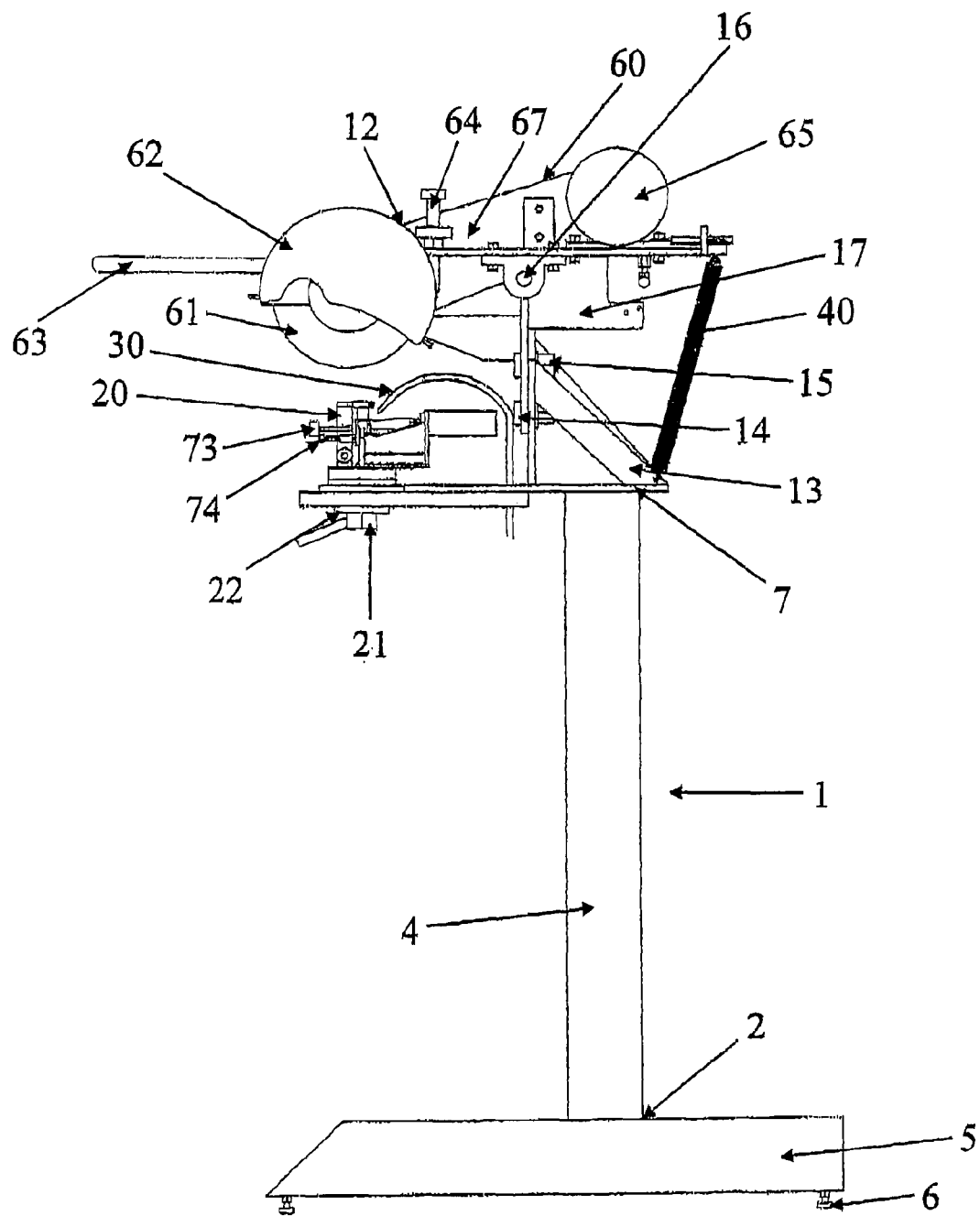
FIG. 3 shows a side view of the saw chain sharpening assembly according to a preferred embodiment of the invention.
Figure 4:
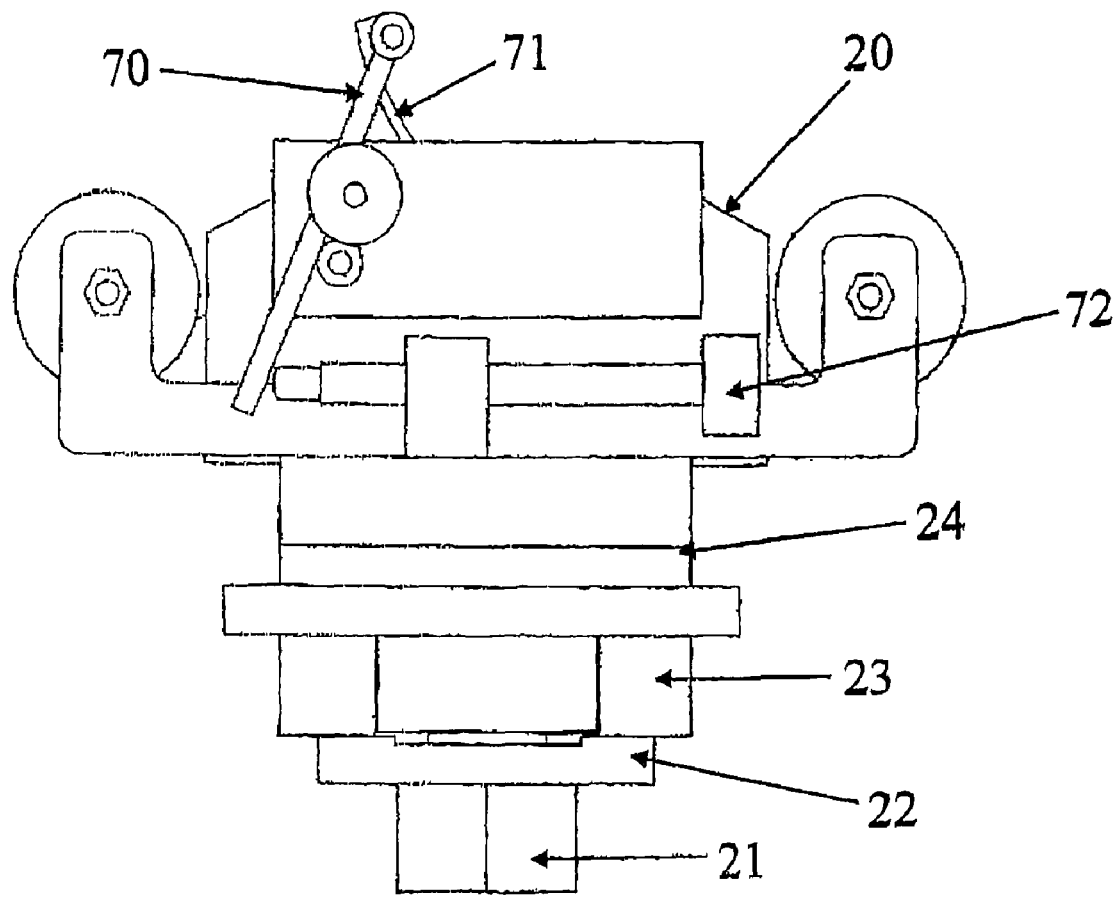
FIG. 4 shows a front view of the saw chain guide and clamping device of the saw chain sharpening assembly according to a preferred embodiment of the invention.
Figure 5:
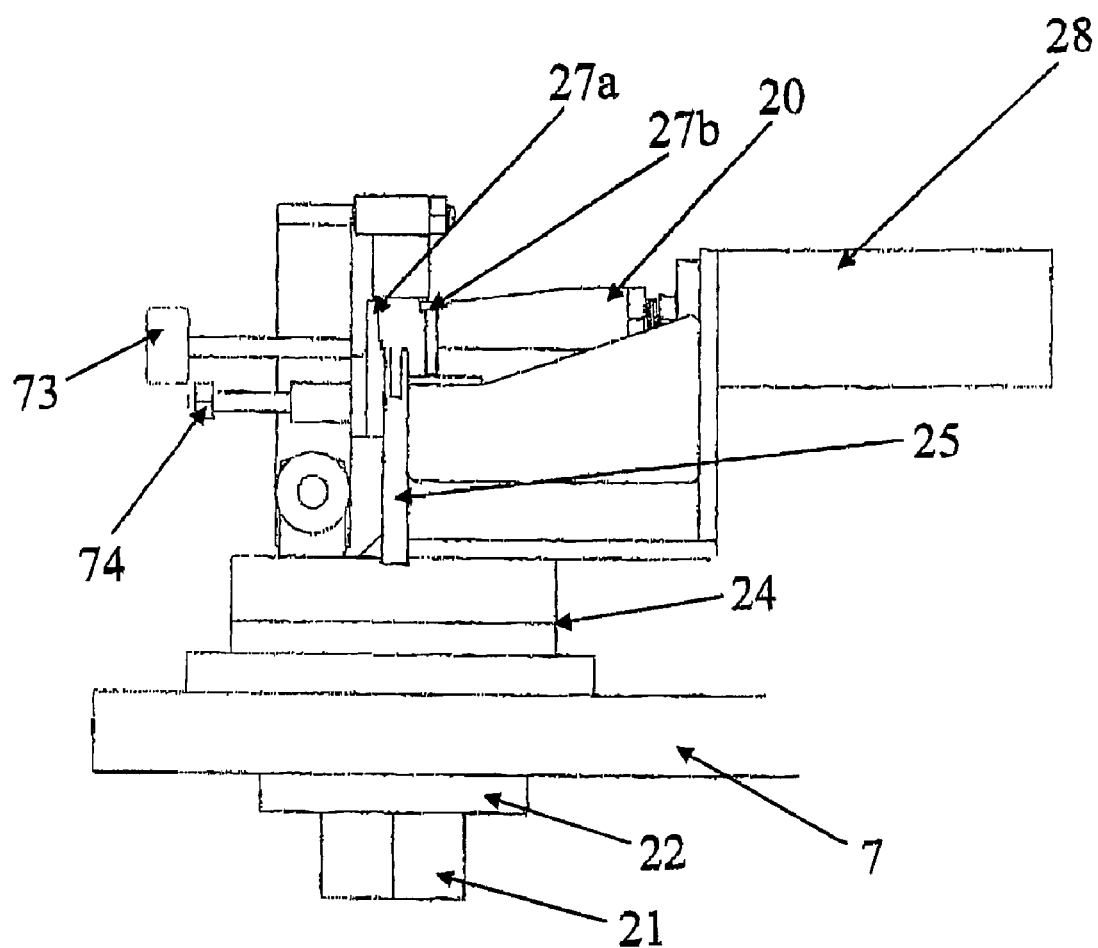
FIG. 5 shows a side view of the clamping device of the saw chain sharpening assembly according to a preferred embodiment of the invention.

In this preferred embodiment, the invention provides a saw chain sharpening assembly 1 which is adapted to efficiently sharpen large saw chains with a ¾" pitch as well as small saw chains with a 0.404" pitch. The saw chain sharpening assembly 1 is preferably made of steel or any other suitable metal material. It is envisaged that the shape, style and dimensions of the saw chain sharpening assembly and its components can be varied as required.

The saw chain sharpening assembly 1 preferably has provided a support member 2 which is adapted to provide support for the entire assembly 1 and receive a grinder 12 and clamp device 20 attached thereto. The support member 2 is preferably in the form of an L-shaped member having a vertical stand 4 and a base member 5 connected perpendicularly to each other which provides height and stability respectively to the assembly 1. The base member 5 preferably has provided at least one leveling means 6. The leveling means is preferably in the form of a foot member which may be adjustable such that the support member 2 can be leveled over an uneven surface to provide a stable assembly 1 to work with. The foot member is preferably made of a rubber material. The coolant tank (not shown) is preferably provided as part of a cooling system for the assembly 1 which is designed to be utilised in order to prevent the teeth from getting overheated which would result in an extended sharpening time.

The support member 2 preferably has provided a horizontal plate 7 which is adapted to be positioned at the top of the vertical stand 4 of the support member 2 such that the vertical stand 4 of the support member 2 is positioned at the back end of the horizontal plate 7. The horizontal plate 7 preferably has provided at least one aperture extending therethrough. A first aperture 8 is preferably provided toward the front end of the horizontal plate 7. The first aperture (not shown) is preferably adapted to receive a suitable securing means such as a bolt or the like therethrough, so that a clamping device 20 can be secured to the horizontal plate 7, allowing the horizontal plate 7 to act as a vice for the clamping device 20. A second aperture (not shown) is preferably located behind the position of the clamping device 20, when viewing the assembly 1 from the front end, and is adapted to receive a hose/pipeline 30 of the cooling system therethrough. The hose 30 is preferably adapted to be connected to a coolant tank (not shown) provided at the base of the assembly 1 and is adapted to extend upwardly from the horizontal plate through the aperture in the horizontal plate 7, to be positioned so that it overhangs the clamping device 20 and the coolant can be distributed from the tip of the hose 30 onto the saw chain teeth (not shown) in the case of overheating.

The saw chain sharpening assembly 1 preferably has provided a grinder head support 11 which is adapted to support and allow adjustment of the grinder head 12. The grinder head support 11 is preferably secured to, and adapted to extend upwardly from, the horizontal plate 7 of the assembly 1. The saw chain sharpening assembly 1 preferably has provided at least one support bracket member 13 which is adapted to secure the grinder head support 11 and horizontal plate 7 to the vertical stand 4 of the support member 2. In a preferred embodiment of the invention, the grinder head support 11 preferably has provided at least one aperture (not shown) which is adapted to receive at least one securing means 14 such as a bolt or the like therethrough. The aperture(s) and bolt(s) is/are adapted to be positioned centrally of the grinder head support 11 and is/are adapted to provide a means for enabling the angle of the grinder head 12 to be tilted and/or adjusted upon tightening or loosening of a lock nut 15 of the bolt 14. The grinder head support 11 preferably has provided a further aperture which is adapted to receive a bolt (not shown) or the like for securing a depth stopper plate 50 thereto.

Provided at the top of the grinder head support 11 is preferably a pivot member 16. The grinder head 12 is preferably adapted to rotate about the central pivotal axis of the pivot member 16 to allow upward and downward movement of the grinder head 12. Provided below the pivot member 16, and extending outwardly from the grinder head support 11 toward the back end of the assembly 1, is preferably a mounting bracket 17 which is adapted to receive an air switch (not shown) thereon.

The saw chain sharpening assembly 1 preferably has provided at least one movement controlling means 40, 50 which ensures that the grinder head 12 does not crash down onto the clamping device 20 from a raised position to damage the grinder head 12 and/or the clamping device 20. A first controlling means 40 is preferably in the form of at least one return spring 40 which is adapted to have a first end connected to a support bracket member 13 and a second opposing end connected to the rear of the grinder head 12 such that when the grinder head 12 is lowered and the rear of the grinder head 12 tilts upwardly, the return spring 40 will be fully extended and the tension in the spring will be increased to prevent the rear of the grinder head 12 from being raised too high.

A second controlling means 50 is preferably a depth stopper plate 50 which is adapted to be securely attached to, and extend forwardly and outwardly from, the grinder head support 11 such that when the grinder head 12 is lowered, it will stop when it comes in contact with the top of the depth stopper plate 50. The depth stopper plate 50 is preferably attached to the grinder head support 11 via a suitable securing means such as a bolt (not shown) or the like. However, it is envisaged that the depth stopper plate 50 could also be integrally formed with the grinder head support or welded thereto. In a preferred embodiment, the positioning of the depth stopper plate 50 can be altered by loosening a knurled lock nut of the bolt provided on the grinder head support plate 11 in order to enable the depth stopper plate 50 to be raised or lowered to a new position. Consequently, the range of movement of the grinder head 12 will be decreased or increased, providing a second means for adjusting the downward travel of the grinder head 12.

The grinder head 12 of the saw chain sharpening assembly 1 preferably has provided a body portion 60. The body portion of the grinder head preferably has provided a grinding wheel 61 which is capable of cutting a saw chain. In a preferred embodiment, the grinding wheel 61 is located at the front end of the grinding head 12. The grinding wheel is preferably adapted to have substantially large dimensions, for example 250 mm×6/12 mm, so that the grinding wheel 61 can sharpen the chain with only a single cut per tooth regardless of the amount of material needed to be removed in order to sharpen a particular tooth of the saw chain. Located over the top portion of the grinding wheel 61 is preferably a guard member 61 which is adapted to protect a user from coming in contact with the grinding wheel 61 when operating the assembly 1. Raising or lowering of the grinding wheel 61 and grinding head 12 can be controlled via a handle member 63 which is preferably provided at the front end of the grinder head 12 and is adapted to extend outwardly therefrom toward a user standing in front of the assembly 1. The handle member 63 is preferably in the form of a rod-like member to enable easy gripping by a user.

The body portion 60 of the grinder head 12 preferably has provided a support member 68. The support member 68 is preferably adapted to extend horizontally from the front end of the grinder head 12 to the back end of the grinder head 12 and is adapted to provide a means for enabling all of the components of the grinder head 12 to be connected thereto. The support member 68 is preferably mounted directly above the pivot member 16 of the grinder head 12. The grinding head 12 preferably has provided an adjustment member 64 which is adapted to enable the depth of the cut provided by the grinding wheel 61 to be adjusted. The adjustment member 64 preferably has provided an outwardly extending member which assists a user in loosening or tightening the adjustment member. Provided on the body portion of the grinder head 13 is preferably a motor 65. The motor 65 is preferably a large, powerful single phase motor (i.e. 240 volt, 1.5 KW) having sufficient power to drive the oversized grinding wheel 61 and ensure that the sharpening action is able to be performed in a single cut for each tooth of the saw chain. The body portion 60 of the grinder head 12 preferably has provided a drive mechanism which has provided all components necessary to drive the grinding wheel 61 including, but not limited to, at least one drive pulley (not shown) and an A section belt (not shown). The body portion 60 of the grinder head 12 preferably has provided a guard member 67 which is adapted to cover the drive mechanism components. Adjustment of the tension of the drive belt can preferably occur via a motor adjustment bolt 66 which is located behind the motor 65 on the grinding head 12. Provided on the grinding head 12 may also be a switch which is adapted to turn the machine on and off.

The saw chain sharpening assembly 1 preferably has provided a clamping device 20 which is adapted to function as a vice for a saw chain which can be received and securely held within the clamping device 20. The clamping device 20 is preferably attached to the horizontal plate 7 of the assembly 1 via a clamping nut 21 and washer 22 which is adapted to secure the base of the clamping device 20 to the front end of the horizontal plate 7 of the assembly 1. Movement of the clamping device 20 to centralize the position of the cutting tooth in relation to the grinding head 20 of the assembly 1 is preferably achieved via the provision of sliding rails 23 which enables the clamping device 20 to be moveable over the horizontal plate 7 and securable via rotation and tightening of the clamping nut 21. The clamping device 20 preferably has provided a rotation joint which provides a means of rotation for the clamping device 20 so that it can be rotated and secured at a set position via loosening of the clamping nut 21.

Provided in the centre of the clamping device 20 is preferably a slide plate member 25. The slide plate member 25 preferably has provided a central recessed portion 26 which is adapted to receive a saw chain therein. Provided on each side of the slide plate member 25 is preferably at least one clamp plate. A first clamp plate 27a is preferably in the form of a fixed chain clamp plate which is adapted to be permanently fixed to a first side of the slide plate member 25. A second clamp plate 27b is preferably provided on the opposite side of the slide plate member 25. The second clamp plate 27b is preferably in the form of an active clamp plate which is adapted to be moveable to increase or decrease the pressure applied by the clamp on either side of the chain, and securely hold or release the chain respectively. Movement of the active clamp plate 27b is preferably controlled via an air ram 28. However, it is envisaged that any other suitable means could also be adopted. It is envisaged that the active clamp plate 27b can be attached to the air ram 28 via a steel rod (not shown) or the like.

The clamping device 20 preferably has provided a pivot assembly 70 which is adapted to be adjustable to control the amount of material to be removed from a tooth of the saw chain and allow a saw chain to be fitted and/or removed from the slide plate member 25 as required. The pivot assembly 70 is preferably in the form of a pawl pivot plate assembly which is adapted to have provided at least one pivot member (not shown), which is adapted to enable a pivot plate (not shown) and/or swinging pawl 71 to rotate thereabout, a pivot plate and a swinging pawl stop member which can be adjusted via an adjustment bolt 72 or the like to alter the amount of material that will be removed from a tooth of a saw chain. The pawl pivot assembly 70 preferably has provided a knob 73 which is adapted to pull the pivot plate assembly 70 away from the clamp plates 27a, 27b holding a chain therein, and a pin 74 which allows the pivot plate to be pulled away, preferably sideways, from the clamping plates 27a, 27b so that the chain can be fitted and/or removed from the slide plate member 25.

In practice, a saw chain is placed onto the slide plate member 25 of the clamping device 20 and the active clamp plate 27b is adjusted to securely hold the saw chain within the clamping device 20 so that an accurate cut is achieved. Depending on the damage to the tooth of the chain, the swinging pawl stop member 71 can be adjusted to determine the amount of material to be cut away from the tooth upon contact of the grinding wheel 61 with the tooth of the chain. The grinder head 12 should also be adjusted to match the pitch and angle of the chain teeth to be cut. The motor 65 of the assembly 1 can then be turned on and the grinder head 12 lowered manually using the handle 63 to allow the grinding wheel 61 to cut a tooth of the saw chain. The large grinding wheel 61 and motor 65 allows the assembly 1 of the invention to efficiently sharpen the tooth with one cut no matter how much material needs to be removed. In addition the unique clamping device 20 ensures that even the heavier chains are securely held in place to prevent damage to the chain when larger cuts are required. In order to move on to the next tooth, the grinder head 12 must be lifted and the chain shifted along within the clamping device 20. In an alternate embodiment, there may be provided a means which enables the chain to automatically be moved along, or moved along upon activation of a moving means.

While we have described herein a particular embodiment of the saw chain sharpening assembly 1, it is further envisaged that other embodiments of the invention could exhibit any number and combination of any one of the features previously described. However, it is to be understood that any variations and modifications can be made without departing from the spirit and scope thereof.

I claim:

1. A saw chain sharpening assembly including:
   a support member;
   a grinding head;
   a clamping device; and
   a cooling system whereby the saw chain sharpening assembly is adapted to provide a means for efficiently sharpening small and/or large chains;
   wherein the clamping device has a slide plate member having a recessed portion which is adapted to receive a saw chain therein.

2. A saw chain sharpening assembly claimed in claim 1 wherein the support member is in the form of an L-shaped member having a vertical stand and a base member;

wherein the base member has at least one leveling means; and wherein the support member has a horizontal plate which is adapted to have a grinder head support and a clamping device attached thereto.

3. A saw chain sharpening assembly as claimed in claim 1 wherein the support member has a horizontal plate which is adapted to have a grinder head support and a clamping device attached thereto;

wherein the horizontal plate is positioned at the top of a vertical stand of the support member; and wherein the horizontal plate has provided at least one aperture.

4. A saw chain sharpening assembly as claimed in claim 1 wherein the grinder head is connected to the assembly via a grinder head support which is adapted to support and allow adjustment of the grinder head.

5. A saw chain sharpening assembly as claimed in claim 4 wherein the grinder head assembly has at least one support bracket member which is adapted to secure the grinder head support and a horizontal plate of the support member to a vertical stand of the support member.

6. A saw chain sharpening assembly as claimed in claim 4 wherein the grinder head support has provided at least one aperture which is adapted to receive a securing means such as a bolt or the like therethrough, wherein the securing means is adapted to provide a means for enabling the angle of the grinder head to be adjusted.

7. A saw chain sharpening assembly as claimed in claim 4 wherein the grinder head support has provided a pivot member whereby the grinder head is able to rotate about a central pivotal axis of the pivot member.

8. A saw chain sharpening assembly as claimed in claim 1 which further comprises at least one movement controlling means which is adapted to prevent the grinder head from crashing down onto the clamping device.

9. A saw chain sharpening assembly as claimed in claim 8 wherein a first movement controlling means is preferably in the form of a return spring which is adapted to be attached to a real end of the grinder head and prevent it from rising too far; and wherein a second movement controlling means is a depth stopper plate which is adapted to be attached to a grinder head support provided directly beneath the grinder head and stop the grinder head from being lowered too far when it contacts the depth stopper plate.

10. A saw chain sharpening assembly as claimed in claim 1 wherein the grinder head has a support member which is adapted to provide a means of supporting and enabling at least one component of the grinder head to be attached thereto; and wherein the grinder head has an adjustment member which is adapted to enable the depth of the cut achieved by a grinding wheel to be adjusted.

11. A saw chain sharpening assembly as claimed in claim 1 wherein the grinder head has provided a drive mechanism for driving a grinding wheel of the assembly including, but not limited to, at least one drive pulley and a belt which is adapted to drive a grinding wheel of the assembly;

wherein the drive mechanism is adapted to have a guard member positioned thereover to protect the components of the drive assembly; and wherein the tension of the belt can be adjusted via an adjustment bolt.

12. A saw chain sharpening assembly as claimed in claim 1 wherein the clamping device is attached to a horizontal plate of the support member via a clamping nut which can be loosened and/or tightened to adjust at least one component of the clamping device.

13. A saw chain sharpening assembly as claimed in claim 1 wherein provided on either side of a slide plate member of the clamping device is at least one clamp plate.

14. A saw chain sharpening assembly as claimed in claim 13 wherein a first clamp plate is preferably a fixed chain clamp plate.

15. A saw chain sharpening assembly as claimed in claim 13 wherein a second clamp plate is preferably an active clamp plate which is adapted to be moveable in order to increase or decrease the pressure applied to a saw chain.

16. A saw chain sharpening assembly as claimed in claim 15 wherein movement of the second clamp plate is operated by an air ram.

17. A saw chain sharpening assembly as claimed in claim 1 wherein the clamping device has an adjustable pivot assembly which is adapted to control the amount of material cut from a saw chain tooth.

18. A saw chain sharpening assembly as claimed in claim 17 wherein the pivot assembly is in the form of a pawl pivot plate assembly including, but not limited to, at least one pivot member, a pivot plate and a swinging pawl stop member.

19. A saw chain sharpening assembly as claimed in claim 18 wherein the pivot assembly has a knob which is adapted to pull the pivot plate assembly away from at least one clamp plate of the clamping device.

20. A saw chain sharpening assembly as claimed in claim 1 wherein the cooling system comprises a coolant tank and a hose/pipeline connected thereto.

* * * * *